United States Patent
Mignot et al.

(10) Patent No.: US 10,416,622 B2
(45) Date of Patent: Sep. 17, 2019

(54) METHOD OF OPERATING A HOME-AUTOMATION INSTALLATION

(75) Inventors: Pierre Mignot, Chateuroux les Alpes (FR); Isabelle Duchene, Marignier (FR); Stephane Lapierre, Sallanches (FR)

(73) Assignee: SOMFY SAS, Cluses (FR)

( * ) Notice: Subject to any disclaimer, the term of this patent is extended or adjusted under 35 U.S.C. 154(b) by 660 days.

(21) Appl. No.: 13/881,852

(22) PCT Filed: Oct. 25, 2011

(86) PCT No.: PCT/EP2011/068632
§ 371 (c)(1),
(2), (4) Date: Jul. 12, 2013

(87) PCT Pub. No.: WO2012/055856
PCT Pub. Date: May 3, 2012

(65) Prior Publication Data
US 2013/0289751 A1    Oct. 31, 2013

(30) Foreign Application Priority Data
Oct. 26, 2010   (FR) ...................... 10 58764

(51) Int. Cl.
*G05B 15/02*      (2006.01)
*H04L 12/28*      (2006.01)

(52) U.S. Cl.
CPC .......... *G05B 15/02* (2013.01); *H04L 12/2809* (2013.01); *G05B 2219/2642* (2013.01)

(58) Field of Classification Search
CPC ................................ G05B 11/01; G05B 15/02
(Continued)

(56) References Cited

U.S. PATENT DOCUMENTS 6,122,350 A * 9/2000 Reeder ..................... G06F 21/82
                                                                340/531
6,535,107 B1   3/2003 Bartz
(Continued)

FOREIGN PATENT DOCUMENTS

DE            0 913 979 A2      5/1999
DE     10 2005 038 471 A        2/2007
(Continued)

*Primary Examiner* — Sean Shechtman
(74) *Attorney, Agent, or Firm* — Haug Partners LLP (57) ABSTRACT

A method of operating a home-automation installation, the home-automation installation including items of equipment fixed in a building and a mobile unit for controlling the items of equipment, the elements communicating over a home-automation network, each element being furnished with an identifier which is specific to it and with an authentication key specific to the home-automation network, termed "common key", identical for all the elements and authenticating an element's membership of the home-automation network, The method includes a step of locating the mobile control unit and delivering an item of position information, then a step of pinpointing using at least the item of position information to pinpoint a particular item of equipment, the pinpointing step allowing the identification of the particular item of equipment and allowing the locating of the particular item of equipment in a mode of configuration of the home-automation installation.

16 Claims, 4 Drawing Sheets

(58) Field of Classification Search
 USPC .......................................................... 700/90
 See application file for complete search history.

(56) References Cited

U.S. PATENT DOCUMENTS

| | | | |
|---|---|---|---|
| 6,563,430 B1* | 5/2003 | Kemink | H04N 21/42202 340/12.22 |
| 7,110,761 B2 | 9/2006 | Remes et al. | |
| 7,136,709 B2* | 11/2006 | Arling | G05B 15/02 340/3.1 |
| 7,289,014 B2 | 10/2007 | Mullet et al. | |
| 7,363,028 B2 | 4/2008 | De Clerq et al. | |
| 7,379,778 B2* | 5/2008 | Hayes | G05B 15/02 340/10.1 |
| 7,516,039 B2 | 4/2009 | McKitterick | |
| 7,683,754 B2 | 3/2010 | Autret | |
| 7,724,687 B2 | 5/2010 | Autret et al. | |
| 7,843,333 B2* | 11/2010 | Angelhag | G01S 5/14 340/12.53 |
| 8,825,035 B2* | 9/2014 | Moton, Jr. | H04L 41/12 455/234.1 |
| 2002/0031228 A1 | 3/2002 | Karkas et al. | |
| 2003/0174049 A1* | 9/2003 | Beigel | G06K 19/0716 340/10.42 |
| 2005/0001733 A1* | 1/2005 | Tsuruta | G08C 17/02 340/12.29 |
| 2006/0004743 A1* | 1/2006 | Murao | H04N 7/17318 |
| 2006/0074494 A1* | 4/2006 | McFarland | G05B 15/02 700/1 |
| 2007/0106898 A1* | 5/2007 | Mizutani | H04L 63/0823 713/171 |
| 2008/0238661 A1 | 10/2008 | Camp et al. | |
| 2009/0080348 A1 | 3/2009 | Hamel et al. | |
| 2009/0195349 A1* | 8/2009 | Frader-Thompson | G01D 4/002 340/3.1 |
| 2011/0105041 A1* | 5/2011 | Maruyama | G08C 17/02 455/66.1 |

FOREIGN PATENT DOCUMENTS

| | | |
|---|---|---|
| DE | 10 2007 059 246 A | 7/2009 |
| EP | 0 973 126 A | 1/2000 |
| EP | 1 164 540 A | 12/2001 |
| EP | 1 482 718 A | 12/2004 |
| FR | 2898719 A | 9/2007 |
| FR | 2924890 A | 6/2009 |
| WO | WO 00/57375 A | 9/2000 |
| WO | WO 01/71685 A | 9/2001 |
| WO | WO 03/007266 A | 1/2003 |
| WO | WO 03/081352 A | 10/2003 |
| WO | WO 03/088486 A | 10/2003 |
| WO | WO 2005/048530 A | 5/2005 |
| WO | WO 2009/017984 A | 2/2009 |
| WO | WO 2010/018538 A | 2/2010 |
| WO | WO 2010/049383 A | 5/2010 |

* cited by examiner

Fig. 3

S1 — Dispose the mobile control unit RCU in the building comprising a home-automation network with common key HK S2 — Determine in the mobile control unit a position information (X1, Y1) or the mobile control unit S3 — Transmit the position information for the mobile control unit S4 — Process the position information (X1, Y1) to identify a particular appliance of the installation S5 — Transmit an identifier of the particular appliance to the mobile control unit S6 — Transmit a command from the mobile control unit to the particular appliance S7 — Execute the command by the particular appliance

Fig. 4

S5' — Transmit a selection instruction to the particular appliance

S6' — Broadcast a command from the mobile control unit on the home-automation network S7' — Execute the command by the appliance that received the selection instruction

Fig. 5

S41 — Process the position information and/or the orientation information and/or the telemetric information by a remote server SRV

METHOD OF OPERATING A HOME-AUTOMATION INSTALLATION

This application is a 371 of PCT/EP2011/068632 filed on Oct. 25, 2011, published on May 3, 2012 under publication number WO 2012/055856, which claims priority benefits from French Patent Application Number 10/58764 filed Oct. 26, 2010, the disclosure of which is incorporated herein by reference.

The invention relates to the field of the control of home-automation appliances within a building or in its environs, such as motorized appliances for closure or solar protection, for heating and air-conditioning, for lighting or for private swimming pool management.

These home-automation appliances communicate with one another with the aid of a home-automation network of radiofrequency type or by carrier currents, and can communicate with remote servers.

In all cases a problem of security and authentication arises, both during the configuration of an installation and during its operation, especially with the prospect of resorting to mobile control elements produced on the basis of commonplace communicating means such as personal digital assistants or mobile telephones such as smartphones.

During operation, the increasing number of home-automation appliances to be controlled makes it necessary moreover to implement simplified ergonomics for selecting the desired appliance, without however resorting to pop-up menus or choices of poorly identifiable icons. This need is all the more marked as an aging part of the population is confronted with problems of vision.

Patent application WO 03/007266 describes the control of a remote object with the aid of a pointer furnished with a light source. Patent application WO 03/088486 describes a near field evaluation method making it possible to ensure, when sending a pairing command, that a transmitter of this command is situated in immediate proximity to a receiver.

U.S. Pat. No. 7,724,687 envisages that a confidential datum such as a "house key" can only be sent from one commands transmitter to another commands transmitter if a commands receiver previously validates this transmission.

Patent application WO 03/081352 describes a method for changing common key while U.S. Pat. No. 7,683,754 describes a method for selecting a group for the transmission of a common key, for example by using the power supply voltage of just the elements of the group.

Patent application WO 2010/049383 describes a portable unit capable of contactless near field communication with electronic tags disposed on home-automation appliances and/or in particular sites of a building, for example at the entrance of the rooms of an accommodation.

Patent applications EP 0 973 126 and EP 1 164 540 describe the use of the memory card SIM code of a mobile telephone, and optionally of a fingerprint reader of this mobile telephone, to securely control appliances. Likewise in respect of U.S. Pat. No. 6,535,107 which relates to the field of the identification of a vehicle driver. In this case, a transponder is inserted into the mobile telephone in order to allow data exchange with the security system of the vehicle.

In patent application EP 1 482 718, the transmitter intended to establish the communication with the element to be controlled is hooked up to the mobile telephone by the earphone jack plug or by coupling and uses a DTMF or analogous modulation to transmit the coded signals from the mobile telephone to the transmitter.

Patent EP 0 913 979 also describes the supplementing of a mobile telephone with an additional transmitter for the remote control of an object. A specific mode allows remote control without use of mobile radiocommunication and the SIM subscriber code of the card is used as the user authentication means. The cellular structure of the mobile communication network is used as possibility for controlling authentication.

Patent application US 2002/0031228 describes a mobile telephone able to communicate both with a public communication network of GSM type and, at short range, with Bluetooth devices, for example hotel room or rental vehicle locks. A connection between the mobile telephone and a remote server is ensured via the GSM network. The remote server transmits the Bluetooth authentication key to the mobile telephone, in encrypted form, decryptable by the mobile telephone. The Bluetooth authentication key is thereafter transmitted by the mobile telephone to the Bluetooth device by means of the Bluetooth transmitter. The user's personal identification code PIN can be used to make the transmission secure.

Patent application DE 10 2005038 471 similarly describes a mobile terminal communicating both on GSM network and on Bluetooth or similar, to allow access to rental vehicles. The user is identified with a password on the mobile terminal.

Patent application DE 10 2007 059 246 describes one and the same device, in the case of a garage door control.

Application WO 00/57375 describes an antitheft security system for domestic electrical appliances. Each time the appliance is powered up, it operates only on receipt of a release code, transmitted by a house controller through the electrical power supply or a local network. Any appliance moved from its authorized position, that is to say not receiving its release code from the house controller, ceases to operate. Provision is made that the house controller may itself be stolen at the same time as the domestic electrical appliance. To alleviate this drawback, the house controller comprises a means of localization for example by way of a cellular network or by GPS and it can transmit its position to a remote operational center, by using for example the Internet or GSM network. The house controller does not have any other function in an installation than to ensure the disabling or the re-enabling of the appliances in the case of their disconnection and reconnection on the electrical network.

Patent application WO 01/71685 describes a universal remote control and methods able to display on the screen of the remote control icons relating to the appliances within radio range of the remote control, and/or control interfaces of these appliances.

Patent application FR 2 924 890 describes a method for automatically selecting a peripheral such as a home-automation appliance using a proximity criterion: a message is broadcast to all the peripherals and each of them responds. As a function of the signal level received, the nearest peripheral is automatically spotted so as to dispatch a command to it.

U.S. Pat No. 7,289,014 describes a system for controlling an access barrier such as a garage door or gate, especially as a function of the position and/or of the direction of motion of a vehicle in the vicinity of the access barrier. It is envisaged (FIG. 8) that particular positions of a transponder or "proximity device" can be trained with the aid of a GPS satellite localization system, in such a way that the control system causes a predetermined action when the "proximity device" regains such a position, after training. For example, if the proximity device is in a so-called action position, then an action on a button causes an opening command, this not being the case outside of this action position.

U.S. Pat. No. 6,563,430 describes a remote control device whose user control interface depends on the position of the control device. Numerous schemes for determining the position are described. The position information is not used to spot a particular appliance.

U.S. Pat. No. 7,363,028 also describes this type of control device and especially a scheme for radiofrequency identification of the appliance nearest to the control device, by progressive decay of the transmission power. There is no recourse to a control device position information for spotting a particular appliance. Conversely, the position of the control device can be deduced from that of a particular appliance, so as to be able to adopt a functional configuration related to this position.

U.S. Pat. No. 7,110,761 describes the use of a pointing device to establish a wireless connection between the pointing device and another device, targeted by the pointing device, in order to acquire a contextual information on the device to be controlled. The pointing device uses the direction of electrical, magnetic or electromagnetic waves.

U.S. Pat. No. 7,516,039 describes a device for mapping a premises comprising several rooms, using an inertial sensor. This device is especially intended for military applications in urban combat.

The aim of the invention is to provide a method of operating an installation remedying the drawbacks mentioned previously and improving the methods known from the prior art. In particular, the invention proposes a secure operating method in which it is possible to spot in a simple and user-friendly manner by virtue of a mobile control unit, such as a mobile telephone, various appliances of the installation both to control them and to insert them geographically into the installation.

The method according to the invention governs the operation of a home-automation installation comprising elements including appliances fixed in a building and including a mobile unit for control of the appliances, the elements communicating on a home-automation network, each element being furnished with its own specific identifier and with an authentication key specific to the home-automation network, termed a "common key", identical for all the elements and authenticating an element's membership of the home-automation network. The method comprises:

a step of locating the mobile control unit with the aid of a localization means included at least partially in the mobile control unit and delivering a position information, and then a step of spotting using at least the position information to spot a particular appliance, the spotting step allowing the identification of the particular appliance in a usage mode of the home-automation installation and allowing the localization of the particular appliance in a configuration mode of the home-automation installation.

The position information can be expressed in a spatial mesh able to differentiate the respective positions of two appliances of the home-automation installation.

The particular appliance can be the appliance nearest to the mobile control unit during the step of locating the mobile control unit.

The method can comprise a step of aiming the particular appliance, using a means of aiming of the mobile control unit, able to provide an aiming information and in that the position information comprises the aiming information.

The aiming information can comprise an information of orientation of the mobile control unit during the aiming step and/or an information regarding the distance between the mobile control unit and the particular appliance, especially a telemetric information coming from the mobile control unit aiming means.

The method can comprise, subsequent to the spotting step, a step of transmitting to the mobile control unit an identifier of the particular appliance and/or of transmitting to the particular appliance a selection instruction.

The position information can be transmitted on the home-automation network to all of the appliances or at least to a specific appliance.

The position information can be transmitted to a remote server by using a communication means of GSM type and/or a shared network of Internet type.

The spotting step can use appliances localization data, situated in a cartographic memory.

The method can comprise a step of displaying, on a display means of the mobile control unit, a control interface of the particular appliance.

The method can comprise a control step in which the mobile control unit transmits a command message on the home-automation network to the particular appliance, this command message comprising the identifier of the particular home-automation appliance or having been preceded by a selection message comprising the identifier of the particular home-automation appliance and the method can comprise a step of execution of the command by the particular appliance.

The method can comprise a configuration step in which the position of the particular appliance, determined during the spotting step on the basis of the localization of the mobile control unit, is recorded in a cartographic memory.

The data of the cartographic memory can be incorporated in a three-dimensional modeling of the building.

According to the invention, a home-automation installation comprising appliances and a mobile control unit is characterized in that the appliances and the mobile control unit comprise hardware and software means for implementing the above-defined operating method.

According to the invention, the mobile control unit comprises hardware and software means for implementing the above-defined operating method.

The invention also pertains to a computer program comprising a computer program code means suitable for carrying out the steps of the above-defined method, when the program is executed on a computer.

The operating method applies both to a usage mode and to a configuration mode. In contradiction to the devices of the prior art, a position information relating to the mobile control unit is used to spot a particular appliance: either because the position of this appliance is already known and spotting the appliance entails selecting it so that it executes a command, or because it is a newly installed appliance and spotting this appliance entails determining its position so as to be able to record the latter during the configuration step.

Thus, one and the same mobile control unit can serve to configure an installation or can serve to control appliances thereof, the same training applies to the installer and to the user, the same reflexes are acquired. This results in a significant gain both in economic terms and as regards training or information.

Figure 1:
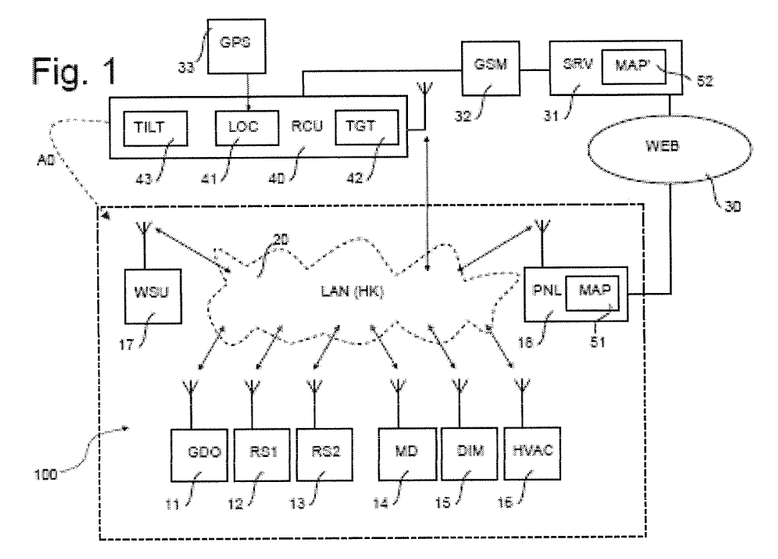
FIG. 1 represents in the form of a functional diagram a home-automation installation and a mobile control unit according to the invention.

The invention will be better understood on reading the description which follows, given solely by way of example while referring to the appended drawings in which:

FIG. 1 represents in the form of a functional diagram a home-automation installation 100 and a mobile control unit 40 according to the invention. The figure also represents the links of the home-automation installation and of the mobile control unit with the environment.

The home-automation installation comprises appliances. Some appliances are of actuator type and comprise in particular one or more electric actuators, especially actuators for maneuvering mobile elements such as a mobile element for closure, solar protection or shading.

Other appliances are of sensor type or of control box type. Thus, in the example of FIG. 1, the installation comprises:
 a first appliance 11 of actuator type for garage door,
 a second appliance 12 of actuator type for roller blind,
 a third appliance 13 also of actuator type for roller blind,
 a fourth appliance 14 of actuator type for electric lock for main door,
 a fifth appliance 15 of dimmer actuator type for variable-intensity lighting device.
 a sixth appliance 16 of heating/air-conditioning actuator type,
 a seventh appliance 17 of control box and sensor type, in the form of a wall switch,
 an eighth appliance 18 of control box and sensor type including a display screen, a tactile control interface and including for example a temperature probe.

Of course, the installation can comprise a much higher number of control boxes and/or sensors and can comprise other appliances in addition to or instead of the above-listed appliances, especially actuator type appliances for terrace awnings, water treatment, ventilation, etc., including of domestic type such as a washing machine, a television etc.

The invention applies, however, preferably to appliances occupying a fixed place in the building.

All the appliances communicate with one another on one and the same home-automation network 20, of local type (LAN) and using a common protocol, for example io-homecontrol, EIB, Zigbee etc. (trademarks). Preferably, the home-automation network is of radiofrequency type, this being represented by bidirectional arrows and an antenna symbol on each appliance. Alternatively, several local networks of different protocol and/or media are used to form the home-automation network 20. The appliances therefore each comprise a means of network link to the home-automation network 20. The appliances are all of active type, that is to say they are able to transmit or to receive a control command, or else a measurement datum coming from a sensor of the appliance.

All the appliances share a common key, termed a house key HK. This key is for example a word of 64 or 128 bits, accommodated in a memory of each appliance and an authentication algorithm using the common key is used to allow an appliance to recognize that a control command or an arbitrary message has indeed come from another appliance of the installation.

Hereinafter, for simplicity, a message will be said to "contain the common key" or "comprise the common key" when its transmitter is authenticated by the common key.

In practice, this authentication is carried out by dialog between the transmitter of the message and its recipient, or is carried out by encryption of the content of the message with the aid of the common key, or else requires both dialog and encryption of the content of the message. The common key is therefore not contained, as such, in the messages.

The eighth appliance 18 can be connected to a shared network 30 of Internet type by a gateway, not represented. A remote server 31 can also be connected to the shared network, thus permitting communication between the eighth appliance and the remote server.

A mobile control unit 40 comprises a means of network link to the home-automation network 20, this network link means also being represented by the symbol of an antenna and a double arrow. This link means allows communication between the mobile control unit and any of the appliances of the home-automation network.

The mobile control unit comprises a localization means 41 making it possible to determine the position of the mobile control unit. It can moreover be linked to the server 31 by a long-distance communication network 32, for example of communication network type for GSM mobile telephones. The localization means 41 preferably uses an external resource 33, for example geolocation satellites of GPS or Galileo type providing signals.

Figure 8:
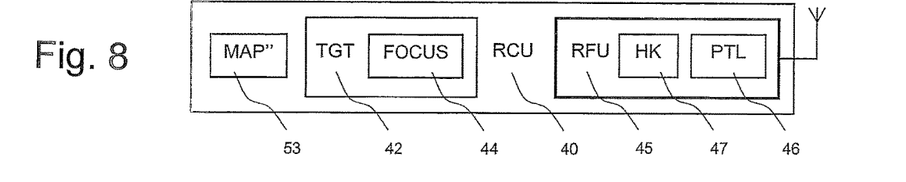
FIG. 8 partially represents the mobile control unit so as to illustrate embodiment details.

Optionally, the mobile control unit can moreover be furnished with an aiming means 42. Advantageously, the aiming means comprises a telemetric means 44 able to provide an information regarding the distance between the mobile control unit and a target object aimed by the aiming means. The aiming means comprises for example a photographic objective of variable focal length with autofocus device, as described in FIG. 8.

The aiming means can comprise a means 43 for measuring the orientation of the mobile control unit, especially an inclination means, comprising for example an accelerometer, especially a 3D accelerometer or any device of compass type.

The localization means can also comprise an accelerometer for establishing a part of a localization information. Advantageously, one and the same 3D accelerometer is used in the localization means, for measurements of displacement with respect to a reference point and in the orientation measurement means for measurements of orientation of the mobile control unit.

A mobile telephone equipped with the hardware means described hereinabove and with software means able to execute the methods described subsequently can advantageously serve as mobile control unit. The means of network link to the home-automation network is for example accommodated in the SIM card of the telephone, or in the battery of the telephone, or it is linked to the telephone by a removable connection, such as a jack plug. The network link means is detailed under the reference 45 in FIG. 8: it comprises, in permanent memory 46, the protocol PTL of the home-automation network and it comprises, in erasable memory 47, the common key HK, if the latter has been transmitted to the network link means. For security reasons, the network link means, functionally linked with the mobile control unit, is however a piece of hardware distinct from the telephone and can only be provided for example by a manufacturer of one of the appliances of the home-automation network. This distinctive character of the network link means appears in the form of a bold line.

The mobile control unit becomes an element of the installation 100 as soon as it communicates with one of the appliances, which membership is symbolized by a dashed arrow A0. However, this installation membership of the mobile control unit may be only provisional, especially in the case where the mobile control unit is used as a configuration tool by an installer.

Figure 2:
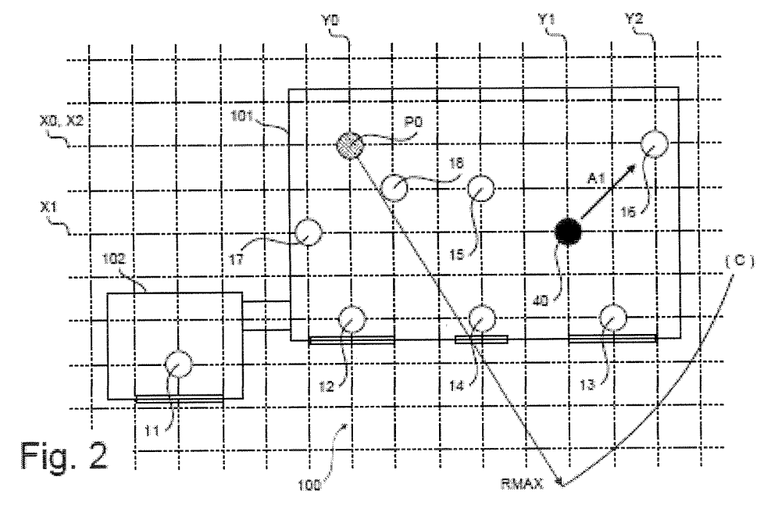
FIG. 2 spatially represents the home-automation installation and the mobile control unit.

FIG. 2 spatially represents a building comprising the home-automation installation and the mobile control unit, according to an in-plane spatial mesh represented by two perpendicular networks of equidistant dashed lines, whose intersections are mesh nodes, spotted by two coordinates (X,Y). Alternatively, the spatial mesh advantageously comprises a third dimension (Z), and each node is spotted by three coordinates (X,Y,Z). The spatial mesh is able to differentiate the respective position of two appliances of the home-automation installation, that is to say these two appliances exhibit different sets of coordinates. Each appliance is represented centered on the nearest node. The distance between two consecutive lines of the mesh (the spacing of the mesh) is therefore less than or equal to the minimum distance separating two appliances.

The spatial mesh must therefore be sufficiently precise, not only to be able to distinguish the current appliances of the installation but also to allow the future incorporation of new appliances. A much finer spatial mesh than that represented can be used, but then offering excess precision with respect to the need. Advantageously, the spatial mesh can be for example twice as precise, or indeed 10 times as precise, as that represented, with a view to the possible installation of other appliances in intermediate positions. A mesh spacing of 10 cm corresponds to a preferred value. FIG. 2, for which the mesh is substantially metric, is therefore not representative of a real mesh. Alternatively, the mesh exhibits an auto-adaptive spacing, the spacing of the mesh being for example defined by passing progressively from a coarse mesh to a finer mesh depending on the existence or otherwise of a plurality of responses to an interrogation message, this message being transmitted with an increasingly low power as described in U.S. Pat. No. 7,363,028.

In the very simplified case of FIG. 2, the installation is distributed in a house main body 101 and in a garage 102 adjoining the main body. Partitions internal to the building are not represented. Bays relating to the garage door, to the main door and to the windows equipped with roller blinds are represented in triple line form.

The mobile control unit 40 is disposed in the installation, its position being spotted by coordinates X1 and Y1 in the spatial mesh. An arrow A1 indicates a direction aimed by the mobile control unit aiming means.

A particular position P0 is spotted by coordinates X0 and Y0. Its role will be described subsequently.

The installation comprises hardware and/or software means making it possible to govern its operation in accordance with the method which is the subject of the invention. The software means can especially comprise a computer program code means suitable for carrying out the steps of the method according to the invention, when the program runs on a computer. In particular, the installation comprises a means for locating the mobile control unit, the localization means being included at least partially in the mobile control unit and delivering a position information. The installation also comprises a spotting means using at least the position information to spot a particular appliance. The installation further comprises a means making it possible to identify the particular appliance in a usage mode of the home-automation installation and making it possible to locate the particular appliance in a configuration mode of the home-automation installation.

The control unit comprises hardware and/or software means making it possible to govern its operation in accordance with the method which is the subject of the invention. The software means can especially comprise a computer program code means suitable for carrying out the steps of the method according to the invention, when the program runs on a computer.

Figure 3:
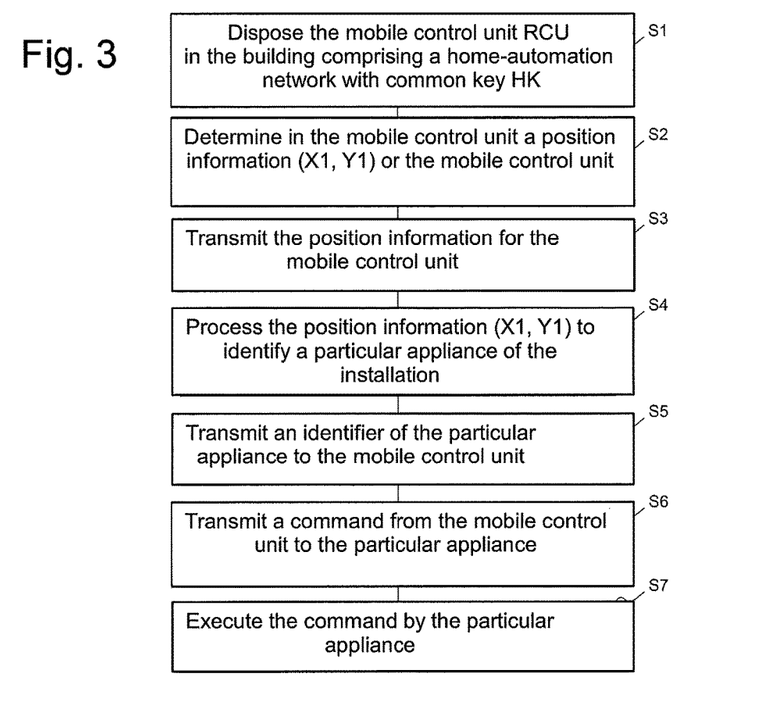
FIG. 3 is a flowchart of a mode of execution of an operating method according to the invention.

A mode of execution of the operating method according to the invention is described hereinafter with reference to FIG. 3.

By virtue of such a mode of execution, the mobile control unit can be used in a secure manner to control the appliances of the installation, especially with the aim of spatially locating an appliance with respect to the mobile control unit or vice versa. In particular, a position information for the mobile control unit is used. This position information can especially be defined by a spatial mesh able to differentiate the respective positions of two appliances of the home-automation installation.

In a first step S1, the mobile control unit is disposed in the building equipped with the home-automation installation of the appliances situated in the building and/or in the environs of the building.

Subsequent to a particular maneuver of the user, a second step S2 is activated, in which a position information for the mobile control unit is determined in the mobile control unit, with the aid of its localization means. If the mobile control unit is in the position of FIG. 2, the position information is for example the pair of coordinates X1, Y1.

The position information can be deduced from GPS geolocation data, corrected so as to obtain a sufficiently precise mesh but without excessive precision. A mesh spacing of 10 cm is for example preferred. If the GPS precision is too large, for example centimetric, then the last digit of coordinates is not taken into account in the position information. If the GPS precision is too low, for example metric, then the displacements measured by the accelerometer of the mobile control unit are taken into account in order to obtain a more precise localization, corresponding to the desired mesh. It is also possible to improve the GPS precision by analysis of the radio power received from the appliances. As specified above, the precision of the mesh can be adapted dynamically, according to the progressive addition of new appliances into the installation.

The displacements can be measured on the basis of a reference position, for example the particular position P0. In the absence of reception of GPS satellite signals, or to reduce the cost, any position information can be deduced simply from the displacements of the mobile control unit on the basis of the reference position.

In a third step S3, the position information for the mobile control unit is broadcast by the latter to the appliances of the home-automation network. This step assumes that the house key has already been provided to the mobile control unit, during a step prior to the implementation of the operating method. For example, the house key has been transmitted in encrypted form to the mobile control unit by the remote server and the GSM communication network.

In a fourth step S4, the position information is processed by at least one specific appliance of the installation, for example the eighth appliance, so as to spot a particular appliance of the installation. A spotting criterion uses the position information for the mobile control unit: for example, the particular appliance is the appliance nearest to the mobile control unit at the moment at which the second step was activated. Other criteria can be used to spot the particular appliance.

Figure 7:
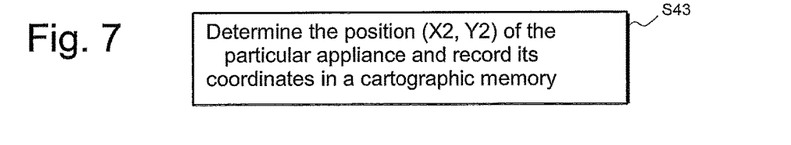
FIG. 7 is a flowchart of a fourth variant of the mode of execution of the operating method.

In order to undertake the identification, the specific appliance comprises a first cartographic memory 51 in which the position coordinates of each appliance of the installation have been stored (during a configuration step which will be described in conjunction with FIG. 7).

Once the particular appliance has been determined, its identifier is transmitted to the mobile control unit by the specific appliance, in a fifth step S5.

In a sixth step S6, the mobile control unit transmits a command to the particular appliance. The command comprises the identifier of the particular appliance and an order to be executed. The latter results from an action of the user on a control interface of the mobile control unit. Alternatively, it may be a prerecorded order, for example an order of change of state. Alternatively, it may be an order resulting from a particular movement of the control unit, for example a pivoting of the latter around an axis.

In a seventh step S7, the particular appliance receives and executes the command.

The method is susceptible of very numerous variants. In all cases, the position information relating to the mobile control unit is used to spot a particular appliance: either because the position of this appliance is already known and spotting the appliance during the processing step entails selecting it so that it executes a command, or because it is a new appliance and spotting the appliance during the processing step entails determining its position so as to be able to record the latter during a configuration step.

Figure 4:
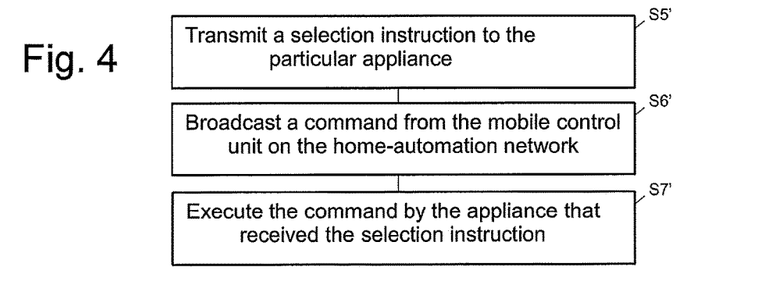
FIG. 4 is a flowchart of a first variant of the mode of execution of the operating method.

A first variant of the mode of execution of the operating method according to the invention is described hereinafter with reference to FIG. 4. This first variant differs from the mode of execution described previously in that the last three steps S5-S7 are respectively replaced with three substitution steps S5'-S7'.

In a fifth substitution step S5', a selection instruction is transmitted to the particular appliance by the specific appliance. The selection instruction advantageously comprises the identifier of the mobile control unit. It signifies that the particular appliance will have to execute any next command broadcast by the mobile control unit on the home-automation network. Alternatively, the particular appliance will have to execute a command marked as specific and broadcast by the mobile control unit on the home-automation network.

In a sixth substitution step S6', the mobile control unit broadcasts a command on the home-automation network. In contradiction to transmission of point-to-point type, the broadcast does not specify a particular recipient.

In a seventh substitution step S7', the control is received by all the appliances but is executed only by the particular appliance (or the set of particular appliances), that previously received the selection instruction.

Figure 5:
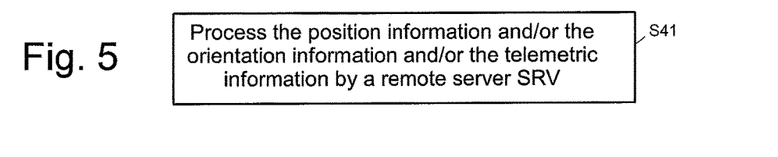
FIG. 5 is a flowchart of a second variant of the mode of execution of the operating method.

A second variant of the mode of execution of the operating method according to the invention is described hereinafter with reference to FIG. 5. This second variant differs from the mode of execution described previously as regards the place of processing of the fourth step. Advantageously, this processing step can be executed in the remote server, the latter being able also to contain a second cartographic memory 52 containing the coordinates of the appliances of the installation.

In this case, the third step S3 can consist in directly dispatching the position information to the remote server, using the GSM communication network. Likewise, the fifth step can consist in also using the GSM network to transmit the identifier of the particular appliance to the mobile control unit. Alternatively, the information can still be transmitted to or received from the specific appliance, the latter communicating them to the remote server via the Internet network.

Figure 6:
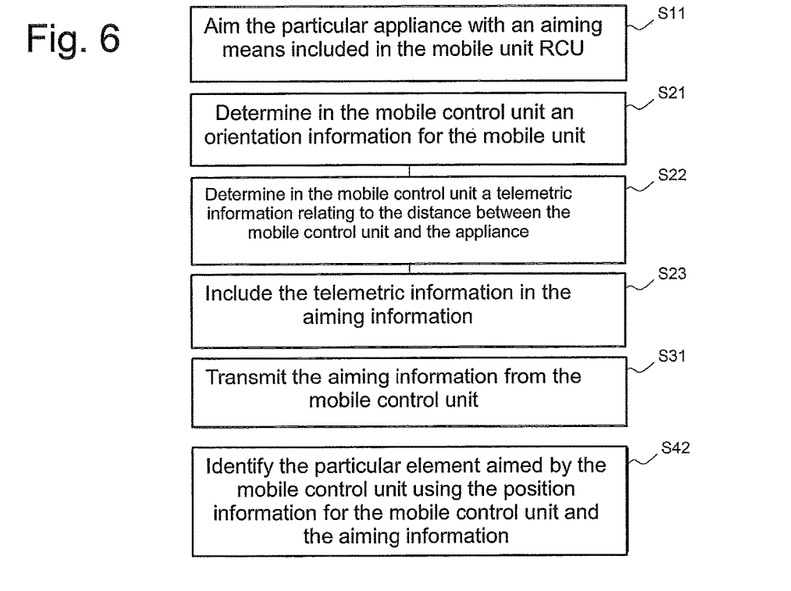
FIG. 6 is a flowchart of a third variant of the mode of execution of the operating method.

A third variant of the mode of execution of the operating method according to the invention is described hereinafter with reference to FIG. 6. This third variant differs from the mode of execution described previously in that it comprises sub-steps added to the operating method.

In a first sub-step S11, supplementing the first step S1, the particular manipulation comprises an action of aiming of the particular appliance with the mobile control unit aiming means.

Next, three sub-steps supplement the second step S2. In a second sub-step S21, an information of orientation of the mobile control unit RCU is determined in the mobile control unit RCU with the aid of the orientation measurement means. In a third sub-step S22, with the aid of the telemetric means, a telemetric information regarding the distance between the mobile control unit RCU and the particular appliance is also determined. In a fourth sub-step S23, the orientation information and the telemetric information are combined to constitute an aiming information. Alternatively, the sighting information comprises only the orientation information if no telemetric means is available.

In a fifth sub-step S31, supplementing the third step, the aiming information is transmitted together with the mobile control unit position information.

In a sixth sub-step S42, supplementing the fourth step, the position information and the aiming information are used simultaneously to identify the particular appliance.

The various steps of the method can be repeated for one and the same particular appliance, as long as the precision does not make it possible to identify a lone particular appliance: for example because two appliances are currently situated at one and the same distance from the mobile control unit. An audible or visual information feedback signal, for example in the form of an icon on the screen of the mobile control unit, may indicate that no particular appliance is identifiable, or conversely that a particular appliance is identified.

The first three variants of the mode of execution of the method have been described in a usage mode of the installation. A fourth variant of the mode of execution of the operating method according to the invention is described hereinafter with reference to FIG. 7. This fourth variant is used in a configuration mode, when the mobile control unit is used, for example by an installer, to configure the installation by establishing especially a mapping of its various appliances. In this case, the coordinates of the appliances are not yet recorded in a cartographic memory.

In this variant, it suffices to input the identifier of the particular appliance by a known means, for example by photographing a barcode of a tag of the appliance, or else by reading an electronic tag of the appliance, comprising its identifier, or else by dispatching an order to the appliance by means of a local command, this order being picked up by the mobile control unit so as to deduce therefrom the identifier, and optionally other information relating to the appliance.

Next, a seventh sub-step S43, in which the appliance's position coordinates, deduced from the position cue and optionally from the aiming information, makes it possible to record these coordinates in the cartographic memory, in conjunction with the identifier of the particular appliance.

Specifically, it therefore suffices that the installer move around the building and place his mobile control unit on each appliance. The identifier of the appliance is transmitted to a transponder of the mobile control unit by an electronic tag of the appliance and the position of the mobile control unit, therefore of the appliance, is determined, the two being recorded in a cartographic memory.

Alternatively, it suffices that the installer remotely aim a barcode tag on each appliance to produce the same result.

Alternatively, manual input of the identifier of the appliance with the aid of a keypad of the mobile control unit is possible.

A third cartographic memory 53 can be disposed on the mobile control unit, to record these data and communicate them en masse subsequently to the remote server or to the specific appliance.

Advantageously, the mobile control unit communicates directly with each new appliance as soon as it has been identified, so as to transmit the house key HK to it or simply to be certain of its operation.

Advantageously, the mobile control unit and/or the remote server and/or the specific appliance comprises software for three-dimensional modeling of a building, able to utilize the data of the cartographic memory to establish and/or supplement a three-dimensional modeling of the building, while including the position of the appliances. The virtual reconstruction of a building including the appliances of the installation can thus be carried out, in particular by combining the invention with the teachings of U.S. Pat. No. 7,516,039.

Figure 9:
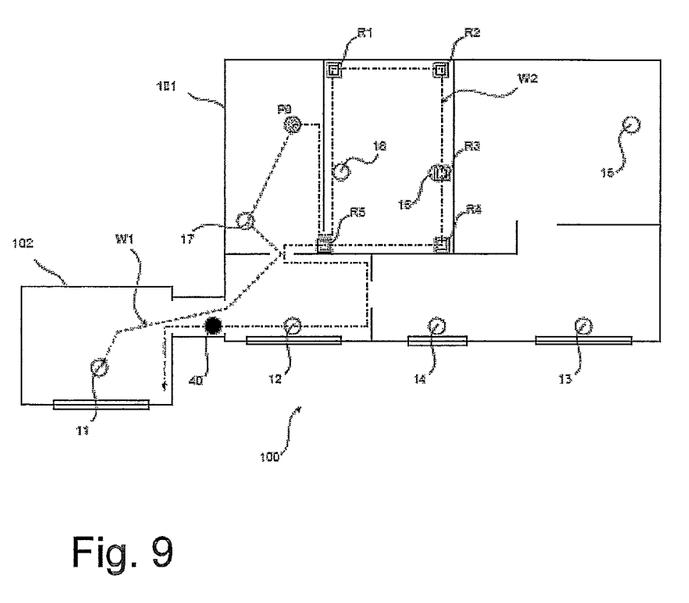
FIG. 9 spatially represents the home-automation installation and the mobile control unit during implementations of the method according to the invention.

FIG. 9 describes two cases of implementation of the control method when it is used in a configuration mode within the previous home-automation installation 100. This time, the internal partitions of the building are apparent.

In a first case of implementation, starting from an initial position P0, the installer furnished with the mobile control unit moves directly from one appliance to the other, as shown diagrammatically by a first route W1, and he undertakes no action on the mobile control unit except during the spotting of each appliance, for example the appliances 17 and 11. Only the position of the appliances is recorded and they are therefore all spotted: either relatively, with respect to one another and/or relative to the initial position, or in an absolute manner if the localization means so allows. The plan of the installation is then supplemented in a schematic manner by the installer, by using drawing-aid tools making it possible to establish a more or less faithful sketch, but greatly aided by the landmarks, namely the appliances.

In a second case of implementation, the installer restricts himself to moving along the walls and partitions, and undertakes an action on the mobile control unit not only during the spotting of an appliance but also during each change of course and/or particular break (passing of a door for example), as shown diagrammatically by a second route W2. For example, along his journey the installer schematically records the changes of course R1, R2, R4 and the passing of a door R5, in addition to the spotting R3 of the appliance 15. And likewise for all the rooms, for all the levels and for all the appliances of each room. The second route is recorded by the mobile control unit (or by the remote server), thereby making it possible to reconstruct all the walls and the passages of the building in addition to the localization of the appliances.

The choice of a relatively central initial position P0 in the building (in contradiction to the case of FIG. 9 allows frequent resetting in relation to this position, thereby avoiding the aggregation of errors—a purely inertial scheme giving rise to such aggregation. Likewise, the presence of the appliances makes it possible to increase the precision of the cartographic charting by combining the positionings established by GPS coordinates or established by inertia with radiogoniometric results related to the spotting of the transmission sources.

The installation plan such as generated automatically by the mobile control unit (or by the remote server) then reveals the appliances, the walls, partitions and openings of the building and can be refined using 2D or 3D drawing-aid software.

For security planning, provision may be made for the reference position to be a position known only to the owner or only to the installer of the installation. This position therefore serves as identification code and some functionalities, for example the transfer of the house key, can be performed only if the mobile control unit is placed in the reference position or in a reduced zone including the reference position.

Another variant (not represented) of the mode of execution of the operating method according to the invention differs from the mode of execution described previously in that steps S3 and S5 are discarded.

Step S4 of processing the position information and spotting the particular appliance is then carried out at the level of the mobile control unit.

The invention makes it possible to use one and the same operating method and one and the same mobile control unit to spot a particular appliance in order to control it in a usage mode and in order to determine its position in a configuration mode. The spotting is therefore of selective type in the first rasp, leading to the spotting of an identifier, and of spatial type in the second case, leading to the spotting of a position. The spotting of spatial type are established as relative positions, for example with respect to the reference position, or as absolute positions, for example in a GPS coordinates reference frame.

Barring incompatibility, the embodiment and its different variants described above may be combined together, and likewise the variants may be combined together: for example, the aiming means described in the usage mode may advantageously be used in the configuration mode.

The invention claimed is:
1. A method of operating a home-automation installation comprising elements including appliances fixed in a building and including a handheld mobile control unit for control of the appliances, the handheld mobile control unit comprising a localization means, the elements communicating on a home-automation network, each element being furnished with its own specific identifier and with an authentication key specific to the home-automation network, termed "common key", identical for all the elements and authenticating an element's membership of the home-automation network,
wherein the method comprises:
a step of locating the handheld mobile control unit with the aid of the localization means and delivering position information locating the position of the handheld mobile control unit, and then a step of spotting, using at least the position information, to spot a particular fixed appliance of the fixed appliances within the building, the spotting step including a user action on the handheld mobile control unit, the spotting step identifying the particular fixed appliance in a usage mode of the home-automation installation and localizing the particular fixed appliance in a configuration mode of the home-automation installation, wherein the spotting step includes using the location of the handheld mobile control unit, in the configuration mode, as the location of the particular fixed appliance and recording said location of the particular fixed appliance, which corresponds to the location of the handheld mobile control unit, and a related specific identifier in a cartographic memory during the configuration mode.

2. The operating method as claimed in claim 1, wherein the position information is expressed in a spatial mesh able to differentiate the respective positions of two appliances of the home-automation installation.

3. The operating method as claimed in claim 1, wherein the particular fixed appliance is the appliance nearest to the handheld mobile control unit during the step of locating the mobile control unit.

4. The operating method as claimed in claim 1, wherein the method comprises a step of aiming the particular fixed appliance, using a means of aiming of the handheld mobile control unit, able to provide an aiming information and wherein the position information comprises the aiming information.

5. The operating method as claimed in claim 4, wherein the aiming information comprises an information of orientation of the handheld mobile control unit during the aiming step and/or an information regarding the distance between the handheld mobile control unit and the particular fixed appliance, wherein the information is a telemetric information coming from the handheld mobile control unit aiming means.

6. The operating method as claimed in claim 1, wherein the method comprises, subsequent to the spotting step, a step of transmitting to the handheld mobile control unit an identifier of the particular fixed appliance and/or of transmitting to the particular fixed appliance a selection instruction.

7. The operating method as claimed claim 6, wherein the position information is transmitted on the home-automation network to all of the appliances or at least to a specific appliance.

8. The operating method as claimed in claim 6, wherein the position information is transmitted to a remote server by using a communication means of GSM type and/or a shared network of Internet type.

9. The operating method as claimed in claim 1, wherein the spotting step uses appliances localization data, situated in a cartographic memory.

10. The operating method as claimed in claim 1, wherein the method comprises a step of displaying, on a display means of the handheld mobile control unit, a control interface of the particular fixed appliance.

11. The operating method as claimed in claim 1, wherein the method comprises a control step in which the handheld mobile control unit transmits a command message on the home-automation network to the particular fixed appliance, this command message comprising the identifier of the particular fixed appliance or having been preceded by a selection message comprising the identifier of the particular fixed appliance, and wherein the method comprises a step of execution of the command by the particular fixed appliance.

12. The method of operating a home-automation installation as claimed in claim 1, wherein the method comprises a configuration step in which the position of the particular fixed appliance, determined during the spotting step on the basis of the localization of the handheld mobile control unit, is recorded in a cartographic memory.

13. The method of operating a home-automation installation as claimed in claim 12, wherein the data of the cartographic memory are incorporated in a three-dimensional modeling of the building.

14. A home-automation installation comprising appliances and a handheld mobile control unit, wherein the appliances and the handheld mobile control unit comprise hardware and software for implementing the operating method as claimed in claim 1.

15. A handheld mobile control unit, wherein the unit comprises hardware and software for implementing the operating method as claimed in claim 1.

16. The method of operating a home-automation installation as claimed in claim 1, further comprising:
a step of moving the handheld mobile control unit to second of the fixed appliances within the building;
a step of performing the locating step and the spotting step for the second fixed appliance within the building; and
a step of iteratively performing the moving step, the locating step and the spotting step for each of the other fixed appliances within the building.

* * * * *